April 10, 1962 F. W. LEUTHESSER Re. 25,155

SINGLE CONTROL HANDLE OPERATED MIXING FAUCET
HAVING A DIVERTER VALVE ASSOCIATED THEREWITH

Original Filed July 27, 1953 3 Sheets-Sheet 1

INVENTOR.
Frederick W. Leuthesser
BY
Wood, Herron & Evans
ATTORNEYS.

INVENTOR.
Frederick W. Leuthesser.
BY
Wood, Herron & Evans.
ATTORNEYS.

April 10, 1962 F. W. LEUTHESSER Re. 25,155

SINGLE CONTROL HANDLE OPERATED MIXING FAUCET
HAVING A DIVERTER VALVE ASSOCIATED THEREWITH

Original Filed July 27, 1953 3 Sheets-Sheet 3

INVENTOR.
Frederick W. Leuthesser.
BY
Wood, Herron & Evans.
ATTORNEYS.

United States Patent Office

Re. 25,155
Reissued Apr. 10, 1962

25,155

SINGLE CONTROL HANDLE OPERATED MIXING FAUCET HAVING A DIVERTER VALVE ASSOCIATED THEREWITH

Frederick W. Leuthesser, Cincinnati, Ohio, assignor, by mesne assignments, to American Radiator & Standard Sanitary Corporation, New York, N.Y., a corporation of Delaware Original No. 2,871,880, dated Feb. 3, 1959, Ser. No. 370,406, July 27, 1953. Application for reissue Jan. 30, 1961, Ser. No. 85,942
7 Claims. (Cl. 137—597)

Matter enclosed in heavy brackets [ ] appears in the original patent but forms no part of this reissue specification; matter printed in italics indicates the additions made by reissue.

This invention relates to faucets, and is directed in particular to an improved mixing faucet construction in which a single operating handle is employed to control and regulate the flow of hot and cold water in all proportions within the temperature range of the water in the respective hot and cold supply lines.

One of the objectives of the present invention is to provide a faucet construction of the type set forth which incorporates a diverter valve in the body of the faucet so that a flow of water, under the control of the single operating handle, may be diverted to a remote outlet, for example to a spray attachment or the like.

Another objective of the invention is to provide a faucet construction of the type set forth in which the faucet spout is mounted on the top of the body of the faucet and is arranged to swing from side to side about the vertical axis of the faucet body. This mounting substantially simplifies the construction of the faucet and permits the use of an already commercially available swing spout which is designed to be used in combination with a diverter valve.

A further objective is to provide a single control handle operated mixing faucet construction which is compact. In the preferred embodiment, two valves, which control the flow of water from the respective supply lines, means to selectively actuate the valves, a diverter valve, and the mounting means for the faucet spout are all disposed within the body of the faucet which is small enough to be enclosed within an attractive housing.

Further objectives of the invention will be readily apparent from the following detailed description of the drawings, in which.

Figure 6:
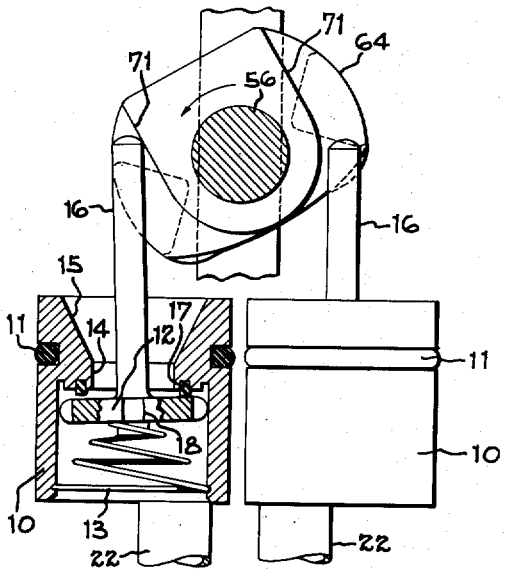
FIGURE 6 is a diagrammatic view showing the valves and valve actuator mechanism as seen from the rear.

The valves which are employed in the present faucet construction are substantially identical with the one disclosed in copending application, filed March 6, 1952, Serial No. 275,199, now abandoned. One of these valves is shown in cross section in FIGURE 6. Generally, each valve comprises a cylindrical body 10 which is adapted to be seated in a bore into which a water supply line opens. The valve body is sealed with respect to the bore by means of a resilient O ring 11 which is seated within an annular groove formed in the outer wall of the valve body near the upper end thereof. The valves are arranged so that they close as a result of pressure within the water supply lines. The lower portion of each valve body 10 is hollowed out to accommodate a valve disc 12 and a conical coil spring 13, the spring serving to urge the valve disc toward seated, closed position. Just above center, the valve body is configurated to provide a central port 14. Above the port the valve body flares outwardly and upwardly as at 15 to a narrow upper rim portion. An elongated valve stem 16 which may be formed as an integral part of disc 12 extends through port 14 and outwardly beyond the upper rim portion of the valve body. An annular groove is provided, concentric with port 14, to seat a ring 17 made of resilient material. It will be seen that water pressure beneath the valve disc will cause the upper face of the disc to seat against ring 17 and also align stem 16 with the central axis of valve body 10. The outer periphery or marginal edge of the valve disc 12 is toothed as at 18 starting outwardly of ring 17. As shown in FIGURE 6, the valve is opened by tipping valve stem 16 to move the disc off its seat against ring 17. Or, otherwise expressed, the valves will open whenever their stems are tipped off the central axis of the respective cylindrical valve bodies.

In the preferred embodiment of the invention, two valves of the type described are seated in appropriate bores in a faucet body which is indicated generally by the numeral 19. The respective valves are mounted in spaced parallel relationship with their stems extending vertically into a mixing chamber 20 which is hollowed out of the upper portion of faucet body 19. In each instance, the bore in which a valve is seated is open at its lower end to a bore 21 of smaller diameter which constitutes a water passageway. At the lower end of the faucet body, each bore 21 is enlarged to receive a water supply line, such as the one indicated at 22, which may be made of copper and soldered to the valve body. Two such lines and bores are provided, one for hot water and one for cold water.

The lower portion of faucet body 19 is of reduced diameter and threaded as at 23 to provide a means for securing the faucet assembly to the top of a sink, a portion of a sink being indicated at 24. The threaded portion 23 is designed to be seated in an appropriate hole in the sink top, with a flat annular shoulder 25 surrounding threaded portion 23 resting on the sink. A resilient washer such as the one indicated at 26 may be provided to seal the faucet with respect to the hole in the sink. A lock nut 27 which is adapted to be tightened against washers 28 underneath the sink locks the faucet in place.

The top of chamber 20 is closed by a cap 29, which cap has its outer periphery turned down to seat within a rabbet provided in the chamber wall. The joint between the cap and the faucet body is sealed by a resilient O ring 30 which resides within a circumferential groove extending around the edge of the cap. The cap may be locked into place on top of the faucet body by bolts (not shown) which may extend through appropriate flanges at the respective sides of the cap and which may thread into holes tapped in bosses formed on the respective sides of the faucet body.

A sleeve 31, formed as an integral part of the cap, extends upwardly from the cap, the sleeve being off-center toward the front of the faucet. Sleeve 31 is designed to receive and seat a cylindrical tailpiece 32 of a faucet spout which is indicated generally at 33. A slip fit is provided between the outer diameter of tailpiece 32 and the inner wall of the sleeve portion 31 of the cap. The tailpiece of the faucet is sealed with respect to the sleeve portion 31 of the cap by an O ring 34 which is seated within an annular groove formed in the tailpiece near the lower end thereof. A smaller groove of the same type is formed in the tailpiece near the upper end thereof, the latter groove receiving a metal snap ring 35. Snap ring 35 serves to rotatably secure a spout nut 36 onto tailpiece 32, the nut being free to turn between the snap ring and a shoulder 37 formed where the tailpiece joins the spout proper. Spout nut 36 is designed to be threaded onto the upper end of sleeve portion 31 of the cap as at 38. The spout nut also serves to lock in place a decorative housing 39 which surrounds the faucet body and rests against the top of the sink.

The two annular grooves which are formed in the tailpiece of the spout serve to lock in place a valve seat insert 40. The insert is substantially thimble-shaped and has an annular groove, formed in its outer wall as at 41, into which the metal of the tailpiece wall is pressed upon formation of the groove to receive snap ring 35. The lower end of insert 40 terminates at the ridge which is provided on the inner wall of the tailpiece upon the forming of the groove to seat O ring 34. The upper end of insert 40 has a central port 42 formed therein and the lower portion is hollowed out as at 43. The insert is designed to cooperate with a diverter valve assembly indicated generally at 44 to seal off the flow of water to the faucet spout when a kitchen sink spray (not shown) is in use. The construction and operation of diverter valve 44 is substantially identical to diverter devices disclosed in United States Patents Nos. 2,172,345 and 2,314,071, and for this reason are not described in detail here. The diverter valve seats in a port 45 which is formed in cap 29 and which opens into chamber 20. Water from chamber 20 must flow through the diverter valve in order to reach spout 33. Briefly, a slidable piston in the diverter valve is arranged so that water will flow through port 42 in the valve insert and into the faucet as long as the valve in the sink spray is closed. When the sink spray is opened, however, the slidable piston causes the diverter valve to close port 42 and thereby divert water to the spray. In order to accommodate the diverter valve to the present construction, a pipe-like extension 46 is provided. This extension threads into a bore 47 in the bottom of chamber 20, this bore opening to a water passageway 48 to which is connected a conduit 49 leading to the sink spray. The upper portion of the tubular extension is threaded internally to receive a tailpipe 50 which is part of the diverter and which depends from the lower end thereof.

It will be noted that the diverter extension 46 provides a post which extends vertically, substantially through the center of mixing chamber 20. This post serves an added function of providing a limit to the movement of the control handle, which function is described in detail at a later point.

The diverter valve is disposed concentrically with respect to the tailpiece of spout 33 so that it does not interfere with the swinging of the spout. It is preferred that the swing of the spout be limited to substantially 180 degrees from one side to the other. For this purpose the lower portion of the tailpiece 32 is cut out to accommodate a stop pin 51 which is press-fitted into a bore of appropriate size provided in the cap 29. The two shoulders provided at the opposite ends of a cut out portion of the tailpiece of the spout engage the stop pin at the two limits of the swinging movement of the spout.

Figure 1:
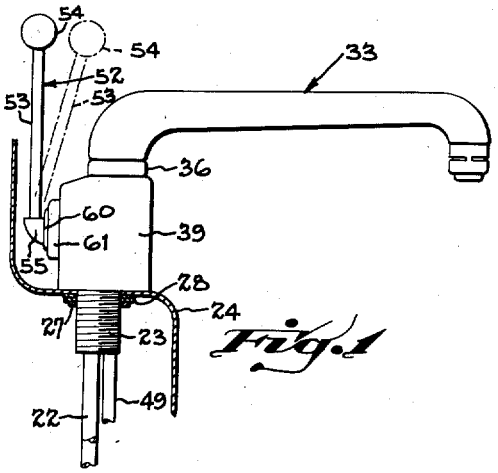
FIGURE 1 is a side elevational view of a single control handle mixing faucet construction incorporating the principles of the present invention.
Figure 2:
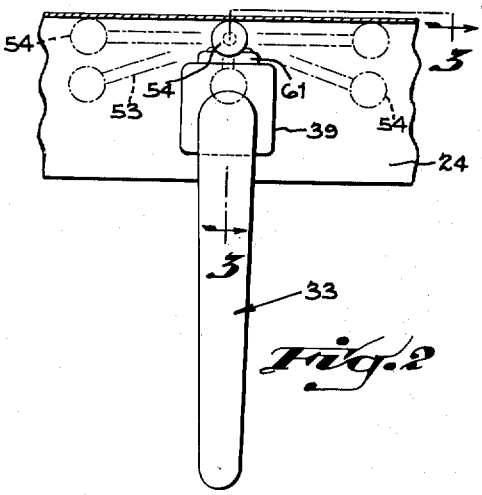
FIGURE 2 is a top plan view thereof.
Figure 3:
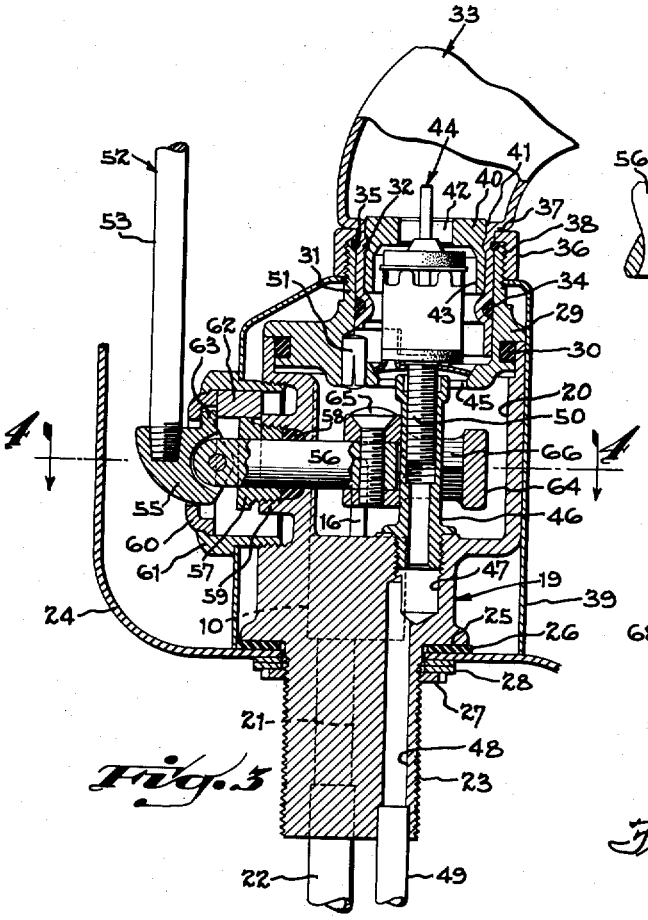
FIGURE 3 is an enlarged cross sectional view taken through the body of the faucet in the line 3—3 of FIGURE 2.

The control handle which is indicated generally at 52 in the drawings is arranged to swing through approximately 90 degrees from one side to the other and through approximately 25 degrees from back to front. The control handle shown consists of a rod 53 having a knob 54 threaded onto its upper end. The rod shown is straight. However, it may be curved to overhang the faucet spout if desired. The lower end of the control handle threads into a pivot arm or connector 55. Generally, the pivot arm is mounted so that a cam shaft 56 which is rotatably journalled within a recess at the inner side of the pivot arm is rotated when the handle is swung from side to side and moved longitudinally when the control handle is swung from back to front. Cam shaft 56 extends through the wall of the faucet body into mixing chamber 20. A packing gland including a packing nut 57 and packing 58, which may consist of graphite impregnated asbestos, is provided to seal the opening for the shaft into chamber 20. An internally threaded bushing 59, formed as part of the faucet body 19, is provided to receive the packing gland. The pivot arm 55 is mounted within an annular race 60 which is seated within a hollow nut 61 threaded into the faucet body concentric with the longitudinal axis of cam shaft 56. The head of packing nut 57 preferably is hexagonal to key in place a pivot arm collar 62 which is seated within the pivot arm nut. The pivot arm collar is semi-circular and resides in the upper half only of the pivot arm nut. The inner diameter of the collar 62 is broached out to fit over the hexagonal head of packing nut 57, whereas the outer diameter thereof is such that it fits snugly within the hollow pivot arm nut 61. Collar 62 is sufficiently wide, as seen in FIGURE 3, so that its inner edge rests against the outer rim of bushing 59 when the pivot arm nut 61 is tightened into place. In this position, the outer edge of collar 62 rests against the marginal edge of race 60. The race is substantially concave to provide an annular channel to the outside of collar 62. A pivot finger 63 formed as part of pivot arm 55 extends into this channel to provide a movable pivot for the arm. It will be seen, therefore, that cam shaft 56 is moved to the rear when the control handle 52 is swung forward, and that this will occur any place in the approximate 90 degrees of side swing of the handle, inasmuch as the pivot finger 63 rides in the groove between race 60 and the collar 62 when the handle is swung from side to side.

Cam shaft 56 extends into the mixing chamber 20 between the respective valve stems 16 of the two valves, and it mounts a valve actuator cam 64. Cam 64 has a bore in the rear thereof which seats the forward end of cam shaft 56, the cam and cam shaft being locked together by means of a screw 65 which, in order to facilitate assembly, is vertically disposed passing through the shaft and threading into the cam. The central portion of the cam forward of the cam shaft is open, as at 66, and surrounds the diverter extension or post 46. As has been suggested above, the extension serves as a post to limit the movement of the control handle 52. The limits are set by the shape of the opening 66 in the cam. Fore-and-aft movement, approximately 25 degrees in the instance shown, of the handle is dependent upon the length of the opening. See FIGURE 4. Handle movement from side to side, approximately 90 degrees in the present instance, is limited by the shape of the valve actuator cam at the two sides of the diverter extension 46. The two side portions of the cam constitute ribs indicated at 67 and 68 respectively in FIGURE 5. These ribs taper symmetrically inwardly and are wedge-shaped in cross section, the two slanting faces of each rib being disposed at approximately 90 degrees to one another. The inner edges of the respective ribs lie in a plane which is common to the longitudinal axis of the cam shaft 56 and are spaced from the respective sides of the diverter extension or post 46 so that when the valve actuator cam is rotated through approximately 45 degrees in either direction from the position shown in FIGURE 5, the upper face of one rib and the lower face of the other rib contact opposite sides of post 46 to limit the rotative movement of the cam shaft 56.

The two sides of the valve actuator cam toward the rear constitute the actual cam surfaces which contact the valve stems to actuate the valves. See FIGURES 10–13. When the handle is straight up and down, in the off position, the valve actuator cam is centered with respect to the two valve stems and disposed forward of them in the mixing chamber. In this position the rear face of the diverter extension 46 is in engagement with the rear edge of opening 6. As will be seen in FIGURE 4, the rear marginal edge of opening 66, where it engages the diverter under these conditions, is configurated as shown at 69 to provide a shallow vertical groove which cooperates with the side wall of the extension to assist in "homing" the control handle at the off position.

Figure 4:
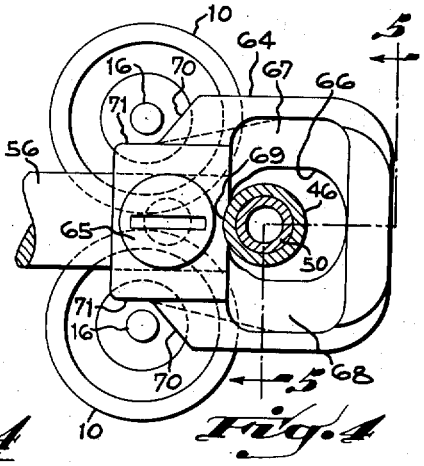
FIGURE 4 is a fragmentary cross sectional view taken on the line 4—4 of FIGURE 3 showing the valves and valve actuator mechanism of the present faucet construction.
Figure 5:
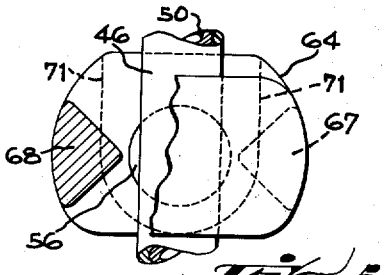
FIGURE 5 is a fragmentary cross sectional view taken on the line 5—5 of FIGURE 4 further illustrating the valve actuator mechanism shown in FIGURE 4.
Figure 7:
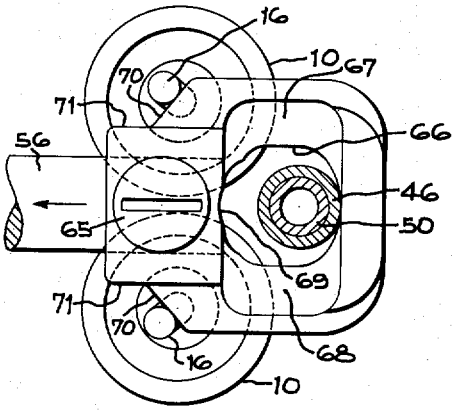
FIGURE 7 is a view similar to FIGURE 4 in which the valve actuator mechanism is shown in position to open both valves equally and simultaneously.

It will be noted from FIGURE 4 that when the control handle is pulled straight forward from the off position, the two angulated cam surfaces 70 at the two sides of the valve actuator cam will engage both valve stems simultaneously and tip them an equal amount. This condition is shown in FIGURE 7. However, if on the other hand the valve handle is swung to either side from the off position without being moved forward, the rear portion of the valve actuator cam, which resides between the two stems when the faucet is off, will engage one, but only one, of the two valve stems. This condition is shown in FIGURE 6. The two sides of the valve actuator cam at the rear thereof are substantially flat whereas the bottom portion thereof is rounded on the center of cam shaft 56. Thus, when shaft 56 is rotated to the left as seen in FIGURE 6, the flat cam surface indicated at 71 makes contact with the valve stem at the left while the round lower surface of this portion of the sam clears the other valve stem. Under these circumstances, of course, only the left valve is opened.

The combination of pulling the control handle forward and swinging it to a side causes both valves to be opened, but in unequal amounts depending upon how far the control handle is moved from the "off" position. The curvature of the cam surfaces at the respective sides of the valve actuator cam is an unusual one which is best understood, it is believed, from a comparison of FIGURES 7–9. The upper portion of cam surface 70 to the rear thereof is disposed, as seen in plan view, at approximately 50 degrees to the longitudinal axis of the cam shaft. The angulation of the cam surface 70 which makes contact with the valve stems decreases as the valve actuator cam is rotated away from the valve. Comparing the upper one of the two valves shown in each of the FIGURES 7, 8 and 9 will show that the angulation of the cam surface, as seen from the top, is substantially proportionate to the amount that the actuator cam is revolved about shaft 56 so that when the shaft is turned through approximately 45 degrees from the horizontal, the valve stem of the upper one of the two shown in these figures is tipped only slightly, whereas the lower one of the two is tipped so that the valve is substantially fully open.

Figure 8:
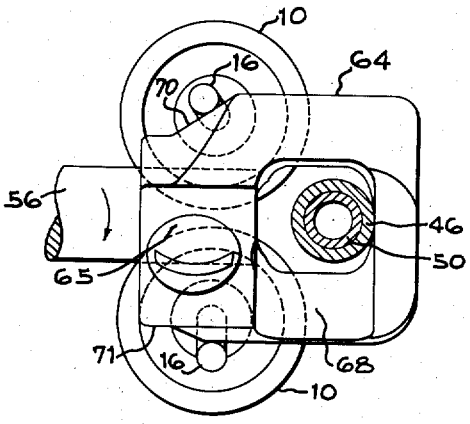
FIGURE 8 is a view similar to FIGURE 7 in which the valve actuator mechanism is shown in position to open one of the valves more than the other.
Figure 9:
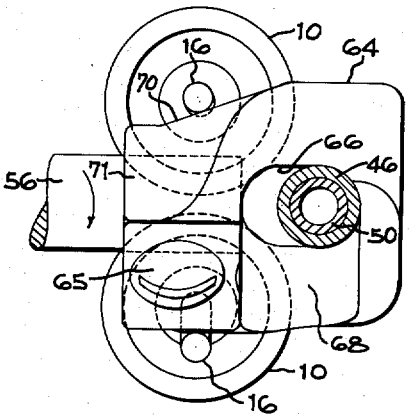
FIGURE 9 is a view similar to FIGURES 7 and 8 showing the valve actuator mechanism in position to fully open one valve while the other valve is substantially closed.
Figure 10:
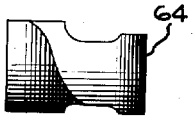
FIGURE 10 is a side elevational view of the valve actuator cam illustrated in FIGURES 5–9 inclusive.
Figure 11:
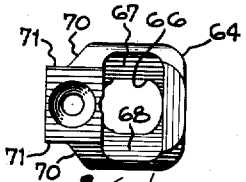
FIGURE 11 is a top plan view of the valve actuator cam shown in FIGURE 10.
Figure 12:
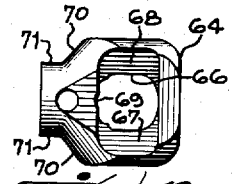
FIGURE 12 is a bottom plan view of the valve actuator cam of FIGURE 10.
Figure 13:
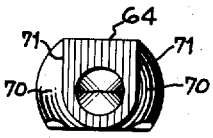
FIGURE 13 is a rear elevational view of the valve actuator cam of FIGURE 10.

FIGURE 7 represents a condition in which the handle is pulled straight forward from the off position. Both valve stems are contacted and both valves are open an equal amount. In FIGURE 8 the valve handle is swung to the left. Both valve stems are still contacted but now the lower valve, the left valve in the faucet, is opened considerably more than the other valve. FIGURE 9 represents a condition in which the valve handle has been swung completely to the left and pulled forward. Under these circumstances, the lower valve, or left one, is fully opened, whereas the upper valve is opened only slightly.

The handle may be moved freely to any position within the limits described above; therefore, all proportions of mixtures of hot and cold water may be discharged from the faucet. Generally, however, cool to cold mixtures are obtainable by swinging the handle to the right of center, and warm to hot mixtures obtainable by swinging the handle to the left of center. The volume of water discharged is dependent upon how far the handle is moved from center or from the "off" position.

In the faucet construction described above, the valve actuator cam 64 provides the limits for the movement of the faucet handle. In the modification disclosed in FIGURES 14–17, the valve actuator cam serves to limit the fore-and-aft movement of the control handle; however, the sidewise movement is controlled by stop means which are associated with the pivot arm assembly at the rear of the faucet body. Thus, the portion of the valve actuator cam 64 which surrounds the post or extensions 46 of the diverter valve assembly, including the two ribs 67 and 68, is not required. The valve actuator cam employed in the modification is indicated generally at 72. This cam includes the curved cam surfaces 70 at the rear and the vertical groove 69 which are described above. The modified cam is also secured to the cam shaft 56 by means of a metal screw 65. Rearward movement of the handle to "home" or "off" position is limited by the cam 72 seating against the post 46. The other limit, when the handle is swung forwardly from "off" position, is provided by the abutment of rear face 73 of cam 72 with the rear wall 74 of mixing chamber 20 in the area surrounding cam shaft 56.

It will be appreciated that means other than the vertical groove 69, a detent for example, may be provided for homing the handle at the "off" position. The operation of the handle and engagement of the cam surfaces with the valve stems in the various positions of the handle are substantially identical with those described above in connection with the explanation of the operation of the valve actuator cam 64.

Figure 14:
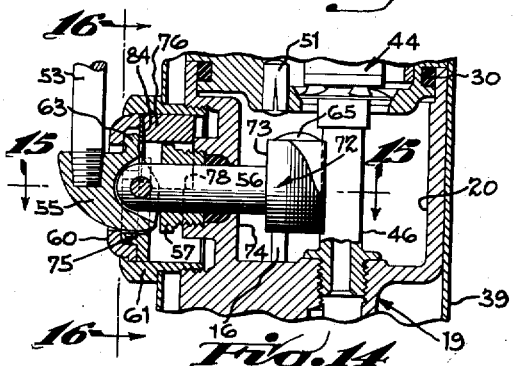
FIGURE 14 is a fragmentary cross sectional view similar to FIGURE 3 illustrating a modified form of the invention.
Figure 15:
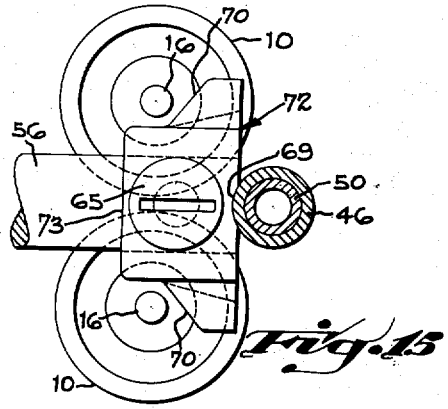
FIGURE 15 is a fragmentary cross sectional view taken on the line 15—15 of FIGURE 14.
Figure 16:
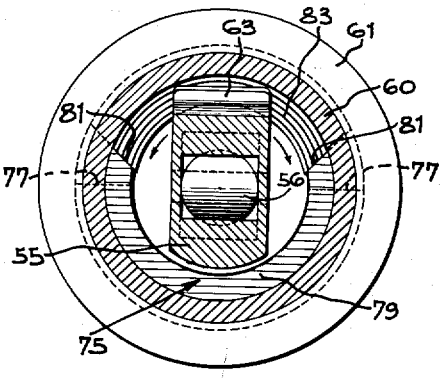
FIGURE 16 is a fragmentary cross sectional view taken on the line 16—16 of FIGURE 14.
Figure 17:
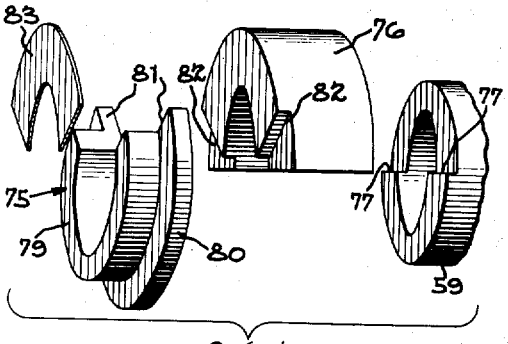
FIGURE 17 is an exploded view, showing in perspective, the elements of the handle stop means utilized in the modification of FIGURE 14.

In the modification, the means to limit the sidewise movement of the handle consists of a stop element indicated generally at 75 which is seated within the pivot arm nut 61 at the inside of the annular race element 60. It is found to be desirable to arrange the stop element so that forces placed upon it are transmitted to and absorbed by the body of the faucet. For this purpose, a modified pivot arm collar 76 is provided, this collar corresponding to pivot arm collar 62 in the embodiment described above. As will be seen from FIGURE 17, the bushing 59 which seats packing nut 57 is shaped to provide a pair of shoulders 77 which are disposed at the respective opposite sides in the rim area thereof. These shoulders are designed to receive a pair of substantially identical shoulders 78 which are formed at the innerface of the modified pivot arm collar 76, so that when the collar is seated as shown in FIGURE 14, it is restrained against rotational movement. Thus, in the modification, it is unnecessary to have the collar keyed to the packing nut.

The stop element 75 consists of a sleeve 79 having an annular flange thereon, the sleeve and flange being formed in one piece. The upper portion of the stop element has a segment cut out of it to provide two angulated abutment faces 81. The pivot arm collar 76 at the two sides of the rear face is configurated to provide recesses 82—82 which receive the flange portion 80 of stop element 75 to key the two together. Thus, a force tending to rotate stop element 75 is transmitted to the body of the faucet through annular collar 76 to bushing 59. The sleeve portion 79 of stop element 75 is designed to seat within the concave innerface of annular race 60 to position the respective abutment faces 81 to intercept and stop the finger 63 which is on pivot arm 55. (See FIGURE 16.)

It will be appreciated that little force is required in order to tip the valve stems to open the respective valves. Although the packing gland, consisting of nut 57 and packing 58, offers some frictional resistance to the movement of the handle, it may be found desirable to provide an element such as the one indicated at 83 to increase the frictional resistance. The friction element 83 consists of a segment of a washer which is made of hard metal and which is shaped to fit against the rear face of the pivot arm collar with its respective opposite ends seated upon the abutment faces 81 in the annular flange portion 80 of the stop element. In order to permit flexing of the friction element 83, the rear face of pivot arm collar 76 may be relieved slightly as shown at 84 in FIGURE 14. The frictional element, therefore, is disposed to press rearwardly against the pivot finger 63 and place a force upon it which resists sidewise handle movement.

In both the modifications disclosed, the axis of the cam shaft 56 resides in a plane which is normal to the vertical axis of the faucet body. It will be appreciated, however, that the axis of the cam shaft may be canted substantially with respect to the axis of the faucet body and still not interfere with the operation of the positioning of the diverter valve. In addition, the connection between the handle and the cam shaft, although shown at the rear of the faucet body, could be placed anywhere around the body of the faucet. For example, the relationship of the actuator cam to the faucet body could be reversed completely, so that the handle is positioned at the front of the faucet body.

Having described my invention, I claim:

1. In a single lever mixing faucet having a diverter valve associated therewith a faucet body having a mixing chamber therein, a cap closing the upper end of said mixing chamber, means to mount said diverter valve unit in said cap, a spout rotatably mounted in said cap above said diverter valve unit, a tailpipe depending from the lower end of said diverter valve unit into and through said mixing chamber, said tailpipe constituting an outlet passage of said diverter valve unit, a pair of toggle valves seated within said faucet body adapted respectively to control the flow of hot and cold water into said mixing chamber, each of said valves having a valve stem extending into said chamber, the respective stems being disposed in spaced parallel relation with respect to one another, a shaft slidably mounted in a side of said faucet body and extending into said mixing chamber between the respective valve stems, a valve actuator secured to said shaft, said valve actuator having cam surfaces thereon adapted to contact the respective valve stems to open said valves independently of one another upon the rotation of said shaft, additional cam surfaces upon said valve actuator adapted to selectively contact said valve stems upon longitudinal movement of said shaft, means operatively connecting said cam shaft to said lever to rotate said shaft and to move said shaft longitudinally upon movement of said lever, said valve actuator having an opening therein, said tailpiece traversing said opening, and the marginal edges of said opening providing abutment surfaces configurated to provide limits for the rotational and the longitudinal movement of said shaft.

2. In a single lever mixing faucet having a diverter valve associated therewith a faucet body having a mixing chamber therein, means to mount said diverter valve in said faucet body above said mixing chamber, a swing spout rotatably mounted in said faucet body above said diverter valve, a tailpipe depending from said diverter valve through said mixing chamber, said tailpipe constituting an outlet passage for said diverter, a pair of toggle valves seated within said faucet body, said valves adapted to control respectively the flow of hot water and cold water into said mixing chamber, each of said valves having a valve stem extending into said chamber, the respective stems being disposed in spaced parallel relation with respect to one another, each of said valves adapted to open upon the tipping of its stem, a shaft rotatably and slidably mounted in a side of said faucet body and extending into said mixing chamber between the respective valve stems, a valve actuator at the inner end of said shaft, said valve actuator having cam surfaces thereon adapted to contact and tip the respective valve stems independently of one another upon the rotation of said shaft, additional cam surfaces upon said valve actuator adapted to selectively contact and tip said valve stems upon sliding movement of said shaft, means operatively connecting said shaft to said lever at the outside of the faucet body adapted to permit said shaft to be rotated and slid upon movement of said lever, and said valve actuator having a surface thereon adapted to abut said tailpipe to limit the sliding movement of said shaft when said shaft is slid in the direction to move the cam surfaces on said valve actuator away from said stems.

3. In a single lever mixing faucet having a diverter valve associated therewith a faucet body, the interior of said faucet body being hollow to provide a mixing chamber, a pair of valves seated within said faucet body, said valves being adapted to control respectively the flow of water from a hot water supply line and a cold water supply line into said chamber, each of said valves having a valve stem extending therefrom into said chamber, the respective valve stems being disposed in spaced parallel relation when the valves are closed, said valves being adapted to open upon the tipping of said valve stems, a shaft rotatably and slidably mounted in a side of said faucet body and extending into said mixing chamber, a valve actuator at the inner end of said shaft, said valve actuator having cam surfaces thereon disposed to contact and tip the respective valve stems independently of one another upon rotation of said shaft, additional cam surfaces upon said valve actuator adapted to selectively contact and tip the respective valve stems upon sliding movement of said shaft, means connecting said lever to said shaft at the outside of said faucet body, said means mounted for rotational and pivotal movement, whereby said cam shaft may be rotated upon the swinging of said lever in one direction and slid longitudinally upon the swinging of said lever in a direction at right angles to the first direction, means to mount diverter valve in said faucet body above said mixing chamber, a swing spout mounted in said faucet body above said diverter valve, a tailpipe depending from said diverter valve and extending through said mixing chamber, said tail pipe traversing an opening in said valve actuator, and the marginal edges of said opening constituting abutment surfaces to limit the movement of said lever.

4. In a single lever mixing faucet, a faucet having a diverter valve associated therewith a body having a mixing chamber therein, means to mount said diverter valve in said faucet body above said mixing chamber, a spout mounted for swinging movement upon said faucet body above said diverter valve, a tailpipe depending from said diverter valve into and through said mixing chamber, said tailpipe constituting an outlet passage for said diverter valve, a pair of toggle valves seated within said faucet body, said valves adapted to control respectively the flow of hot water and cold water into said mixing chamber, each of said valves having a valve stem extending into said chamber, the respective valve stems being disposed in spaced parallel relation with respect to one another, each of said valves adapted to open upon the tipping of its stem, a shaft slidably mounted in a side of said faucet body and extending into said mixing chamber between the respective valve stems, a valve actuator disposed at the inner end of said shaft, said valve actuator having cam surfaces thereon adapted to contact and tip the respective valve stems independently of one another upon the rotation of said shaft about its longitudinal axis, additional cam surfaces upon said valve actuator adapted to selectively contct and tip said valve stems upon longitudinal movement of said cam shaft, means operatively connected with said shaft at the outside of said faucet body, said means mounted for rotational and pivotal movement to respectively rotate and move said shaft longitudinally, said lever operatively connected with the latter named means, said valve actuator having an opening therein, said diverter tailpipe traversing said opening and marginal edges of said opening providing abutment surfaces adapted to contact said tailpipe and thereby provide limits for the movement of said lever.

5. In a mixing faucet having a diverter valve associated therewith and having a single handle for controlling the flow of hot and cold water, said mixing faucet comprising a faucet body having a mixing chamber therein, a cap closing said mixing chamber, means to mount diverter valve mounted in said cap, a faucet spout rotatablv mounted in said cap above said diverter valve, a tailpipe extending from the lower end of said diverter into and through said mixing chamber, said tailpipe constituting an outlet passage for said diverter, a pair of toggle valves seated within said faucet body, said valves adapted respectively to control the flow of hot water and cold water into said mixing chamber, each of said valves having a valve stem extending into said chamber, the respective stems being disposed in spaced parallel relation with respect to one another, said valves adapted to open upon the tipping of their respective valve stems, a shaft slidably and rotatably mounted in a side of said faucet body and extending into said mixing chamber, a valve actuator secured to said shaft inside of said chamber, said valve actuator having cam surfaces thereon adapted to contact and tip the respective valve stems independently of one another upon the rotation of said shaft, additional cam surfaces upon said valve actuator cam adapted to selectively contact and tip said valve stems upon sliding movement of said shaft, means operatively connecting said shaft with said handle, and means to limit the rotational and sliding movement of said shaft, the latter named means including said tailpipe.

6. In a single lever mixing faucet having a diverter valve associated therewith, [means to mount] said faucet body having a mixing chamber therein, *means to mount* a diverter valve in said faucet body above said mixing chamber, a spout mounted [in] *on* said faucet body above said diverter valve, a tailpipe depending from said diverter valve into and through said mixing chamber, said tailpipe constituting an outlet passage [from] *for* said diverter valve, a pair of toggle valves seated within said faucet body, said valves adapted to control respectively the flow of hot water and cold water into said mixing chamber, each of said valves having a valve stem extending into said chamber, the respective stems being disposed in spaced [parallel relation with respect to one another and to said tailpipe] *relation on opposite sides of the center of the chamber with the axes thereof in the same plane,* said valves adapted to open upon the tipping of their respective valve stems, a shaft rotatably and slidably mounted in a side of said faucet body and extending into said mixing chamber between the respective valve stems *with the longitudinal axis of the shaft normal to the plane of the axes of the stems,* a valve actuator [mouned] *mounted* upon said shaft inside of said mixing chamber, said valve actuator having cam surfaces thereon adapted to contact and tip the respective valve stems independently of one another upon the rotation of said cam shaft, and other cam surfaces upon said valve actuator [cam] adapted to contact and tip both valve stems upon sliding movement of said shaft, means operatively connected with said shaft at the outside of said faucet body, [said] *a* lever operatively connected with the [latter] *last* named means *and operable to actuate said shaft,* and abutment means including said tailpipe to limit the rotational and sliding movement of said shaft and thereby limit the movement of said lever.

7. In a mixing faucet having a diverter valve associated therewith, a single lever faucet body having a mixing chamber therein, means to mount said diverter valve in said faucet body above said mixing chamber, a swing spout rotatably mounted at the top of said faucet body above said diverter valve, a tailpipe depending from said diverter valve into and through said mixing chamber, said tailpipe constituting an outlet passage for said diverter, a pair of valves seated within the floor of said mixing chamber, said valves adapted to control respectively the flow of water from a hot water supply line and a cold water supply line, each of said valves having a valve stem extending into said chamber, the respective stems being disposed in spaced parallel relation with respect to one another and to said tailpipe, a shaft slidably and rotatably mounted in the faucet body at the rear thereof and extending into said mixing chamber between the respective valve stems, a valve actuator carried by said shaft, said valve actuator having cam surfaces thereon adapted to contact and tip the respective valve stems independently of one another upon the rotation of said shaft and to contact and tip both valve stems simultaneously upon the sliding of said shaft, means operatively connecting the outer end of said shaft with said lever, and abutment means including said tailpipe inside of said faucet body to limit the movement of said lever.

References Cited in the file of this patent or the original patent

UNITED STATES PATENTS

| | | |
|---|---|---|
| 1,822,346 | Guiles | Sept. 8, 1931 |
| 1,938,454 | Kellan | Dec. 5, 1933 |
| 2,106,929 | McClure | Feb. 1, 1938 |
| 2,197,586 | McClure | Apr. 16, 1940 |
| 2,301,439 | Moen | Nov. 10, 1942 |
| 2,756,775 | Hyde | July 31, 1956 |

FOREIGN PATENTS

| | | |
|---|---|---|
| 762,270 | France | of 1934 |